(No Model.) 3 Sheets—Sheet 3.
C. I. GREER.
CLOSED CONDUIT FOR ELECTRIC RAILWAYS.
No. 522,894. Patented July 10, 1894.
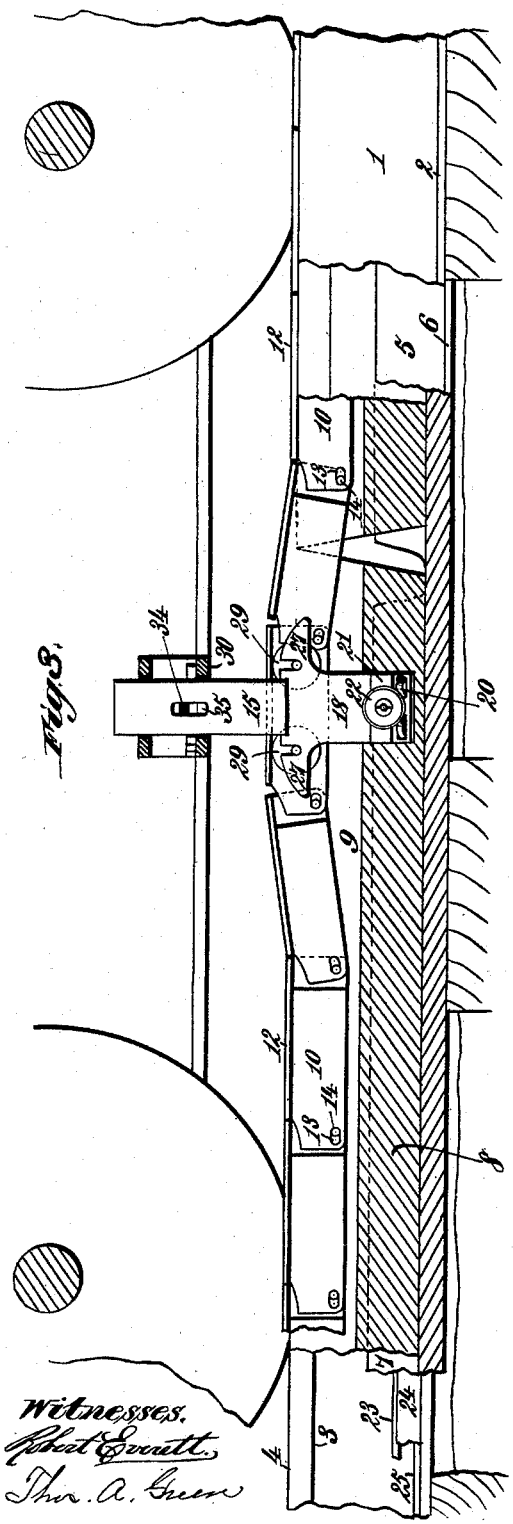
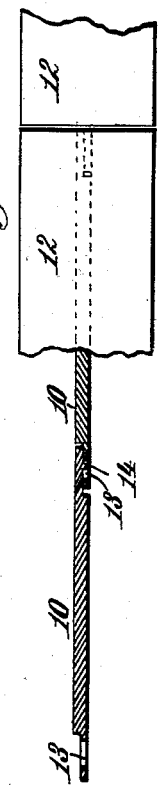
Witnesses.
Robert Everitt,
Thos. A. Green
Inventor
Charles I. Greer.
By James L. Norris
Atty.

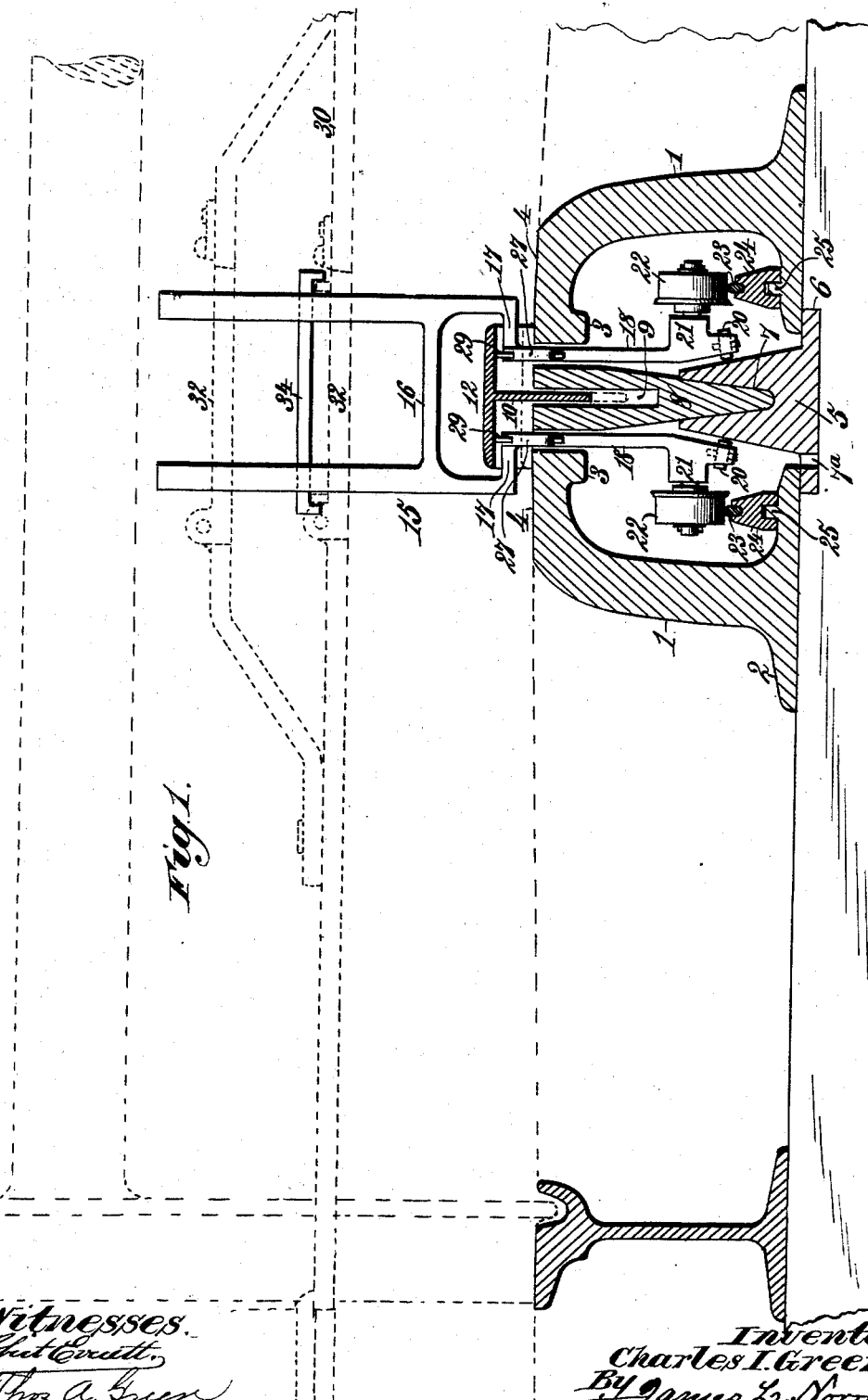

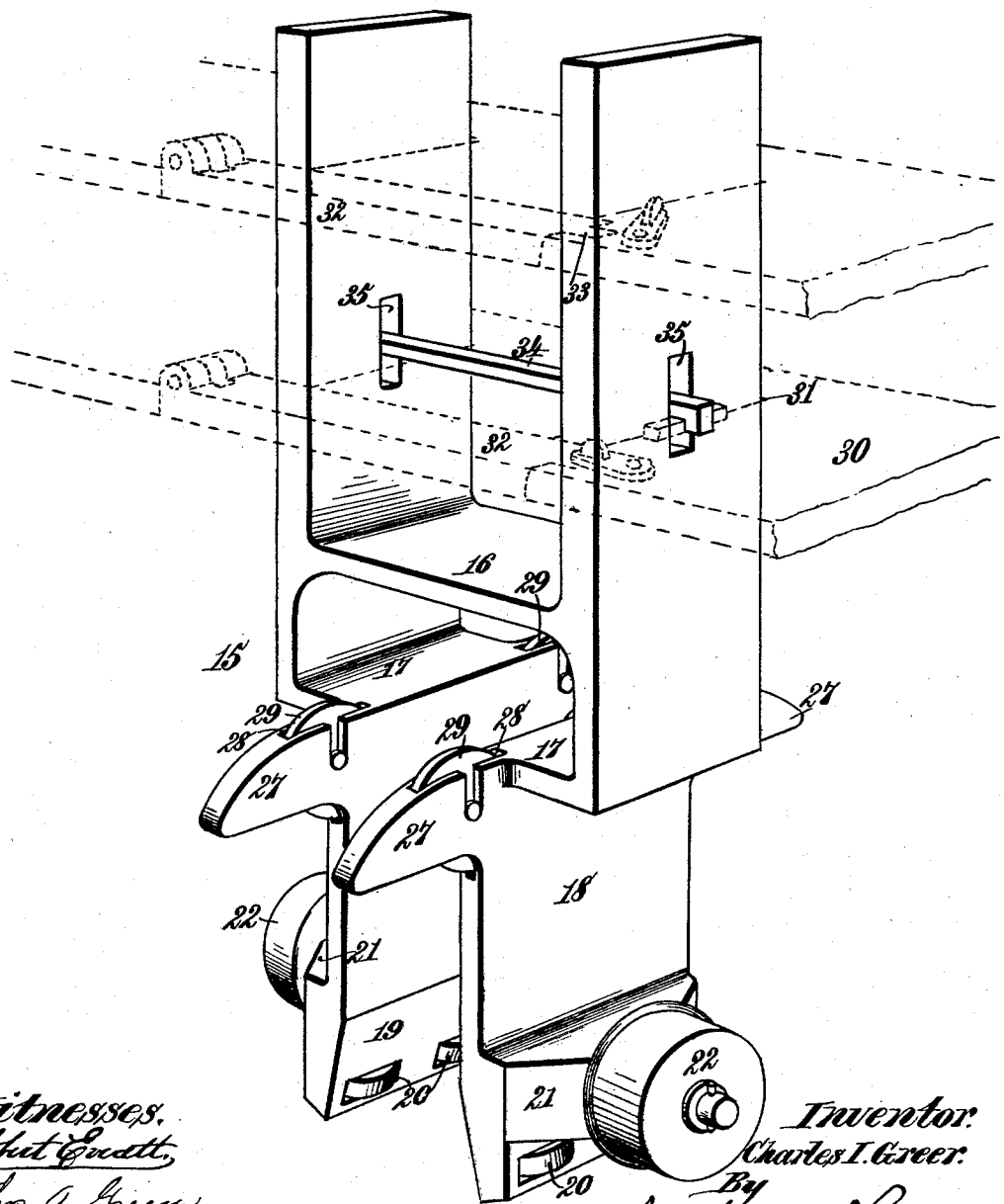

UNITED STATES PATENT OFFICE.

CHARLES I. GREER, OF WASHINGTON, DISTRICT OF COLUMBIA, ASSIGNOR OF ONE-HALF TO CHARLES B. PEIRCE, OF SAME PLACE.

CLOSED CONDUIT FOR ELECTRIC RAILWAYS.

SPECIFICATION forming part of Letters Patent No. 522,894, dated July 10, 1894.

Application filed April 16, 1894. Serial No. 507,699. (No model.)

*To all whom it may concern:*

Be it known that I, CHARLES I. GREER, a citizen of the United States, residing at Washington, in the District of Columbia, have invented new and useful Improvements in Electrical Railway Systems, of which the following is a specification.

My invention relates to electrical railway systems, in which the current is derived from a conductor lying in a conduit, or sub-way.

It is the purpose of said invention, first, to provide a conduit which may be rapidly laid immediately beneath the surface of the roadway; second, to provide the conduit with a wide surface-opening whereby a double trolley may be used upon two separate conductors, one for the direct and the other for the return-current, and whereby, also, access may be had to the interior of the conduit for many purposes, thus avoiding the necessity of placing man-holes at frequent intervals; third, to provide and combine with said conduit a series of cores, or filling-blocks by which the trolley may be supported and guided and by which, also, the width of the surface-opening will be so far occupied that the weight and bulk of the trolley may be greatly diminished, as compared with what would be necesary if the cores or filling-blocks were omitted, the latter being so formed as to insure the effectual drainage of surface water and the ready removal of any one, or more, of their number, should access to the conduit become necessary; fourth, to provide a cover for the slot consisting of a series of rigid sections formed of metal, or other material having great strength and permanence, the sections being pivotally linked together in such manner as to permit any one of the number to be raised with but a small displacement of the two connected sections, the restoration of the raised section to normal position being accomplished by gravity; fifth, to provide a construction and combination of parts whereby the weight of the trolley may be wholly or in a great measure, removed from the car and the frictional resistance to its movement reduced to a minimum; sixth, to provide a trolley having a construction which specially adapts it to raise the sectional slot cover and lay the same in its normal position easily and without noise; seventh, to provide a slot-cover formed in separate rigid sections pivotally linked together in such manner as to permit the rise of the rigid sections successively, with but little disturbance, or displacement, of the two adjacent sections which will be caused to assume such a position that the trolley may readily and naturally pass beneath the end of the section in advance and raise the latter in its turn, while the adjacent end of the section in rear is dropped upon the slot without material shock or noise; and eighth to provide a cover for a slot consisting of rigid, pivotally linked sections, having central webs which are adapted to lie in central longitudinal channels in sectional cores or filling blocks and serve as guides in restoring the sectional cover to place, as well as to prevent any lateral displacement, the construction being such that said webs are never entirely withdrawn from the channels in the cores or filling blocks.

The invention consists in the several novel features of construction and in the parts and combinations of parts hereinafter fully described and then particularly pointed out in the claims.

To enable others skilled in the art to which my invention pertains to fully understand the same, I will describe said invention in detail, reference being had for this purpose to the accompanying drawings, in which—

Figure 1 is a transverse section of a conduit constructed, equipped and covered in accordance with my invention. Fig. 2 is a perspective view, upon an enlarged scale, of the trolley and its supports. Fig. 3 is a sectional elevation, taken longitudinally of the conduit, showing the channel-bars, the cores or filling-blocks, and the slot cover, together with the trolley in operation. Fig. 4 is a detail perspective view of one of the cores or filling-blocks. Fig. 5 is a detail perspective view of one of the covering plates. Fig. 6 is a sectional plan view of a part of the slot-cover, showing the construction of the webs by which they are pivotally linked together.

The reference-numeral 1, in said drawings, indicates the side-walls of the conduit, which are formed of metal, each being substantially similar in form to the other. They are provided with foot-pieces 2, which afford a wide base of support and are adapted to be spiked, or otherwise secured, to the sleepers, like an ordinary rail. From these foot-pieces the side walls 1 rise, with a gentle curvature inward, the curve being sharper near the upper portion which projects inward, its edge being provided with a depending lip 3, and the top being planed off to form a flat surface 4. The lipped edges of the conduit walls are arranged in parallelism, with a uniform interval of separation of about two and one-half inches, more or less, thereby providing a slot of sufficient width to permit access to the interior of the conduit for ordinary purposes.

The reference-numeral 5 indicates a channel bar, having laterally projecting flanges 6 at its base. These channel-bars are arranged continuously between the foot-pieces 2 of the conduit, which overlie the side-flanges 6 and are suitably secured to the sleepers on which the channel-bar 5 rests. The body-portion of the latter is preferably diminished in thickness from the base upward, its form in cross-section being that of a truncated cone, and the central line of the channel bar substantially coincides in position with the central line of the slot above. In the body-portion of the channel-bar is formed a deep, central channel 7, in which is seated a core, or filling-block 8, slightly increasing in thickness from its lower toward its upper edge, the latter being substantially flush with the flat faces 4 on the top of the conduit walls. The opposite vertical faces of the core, or filling-block, which lie between the vertical walls of the slot, are parallel with the latter and the thickness of the block is such as to leave between said block and the walls of the slot channels of equal and suitable width for a purpose hereinafter explained. The filling-blocks are formed in sections of any suitable length, and are oppositely beveled off at their ends in such manner that their lower edges are shorter than the upper. The purpose of this construction is to avoid continuous joints which might retain water, and to provide for rapid drainage and drying. In each filling-block is formed a deep central, longitudinal channel 9, extending vertically from the upper edge of the block to a point half, or more than halfway its width. In this channel lie the central webs 10 of a series of covering-plates 12 of which the webs 10 form part, the latter hanging from the undersides of the covering-plates in the central longitudinal line of the same. The width of said plates is greater than the width of the slot, so that they project upon each side of the slot and overlie the flat faces 4, half an inch more or less on each side of the slot. The width of the channels 9 in the cores, or filling-blocks, is such, relatively to the webs 10, that the latter may rise and fall therein freely. In laying and equipping the conduit, the bottoms of the channels 9, in the cores, or filling-blocks, will lie a little above the upper edges of the channel-bars, and any water that accumulates will be readily drained off. To free the channel bars from water which might stand therein between the beveled ends of the filling-blocks the side walls of the channel-bars inclosing the channels 7 may be chipped away with a cold chisel, upon one, or both sides, at those points where the ends of the filling-blocks will lie, and apertures 7ª may be provided in the foot flanges of the channel-bars so that the water can drain away into the soil.

At one end of each covering-plate 12, the web 10 projects beyond the end of the plate and is provided with a slot, or elongated opening 13, located near the end and lower edges of the web. At the other end a short stud, or pin 14, projects from the face of the web, on one side, the surface being gained and a similar gain being given to the other, or projecting end, but upon the opposite side of the web, the purpose being to enable the projecting end of the web on one plate to lap upon the end of the adjacent web without causing an increased thickness at that point, and to permit the stud 14 to engage the elongated opening 13. The covering-plates throughout the entire series are connected in this manner and the connection is maintained by placing the series in the channels 9 in the filling-blocks, where the lateral play is not sufficient for their disengagement. The length of the openings 13 is such as to permit the covering-plates 12 to separate slightly, when one or more of them are lifted. When undisturbed they rest, by gravity, upon the flat top of the conduit, their squarely cut ends abutting closely against each other, and their edges over-lapping upon the flat faces 4 of the conduit. Any, one or more, of said covering-plates may be raised a moderate distance without disturbing more than the two plates to which it is directly connected, as shown in Fig. 3.

The reference-numeral 15 indicates the frame of the double trolley. This frame is of substantially rectangular form and is composed of two vertical members, united by a strong cross-brace 16, below which said members extend a short distance and are then turned inward to form two horizontal arms 17 which extend over the channels formed by the opposite faces of the filling-blocks and the sides of the slot. From the ends of these arms drop two vertical plates 18 which pass through the channels named and extend downward into the conduit, one on each side of the filling-block. These plates 18 are of such dimensions as to move freely in the channels in which they lie, with but small lateral play. Their lower ends lie opposite the downwardly divergent faces of the channel-bars 5, and are beveled off in substantial parallelism with said faces. Projecting from each of the beveled faces 19, thus formed, are two friction rolls 20, one in advance of the other, and so arranged as to ride upon the inclined lateral faces of the channel-blocks, thereby preventing lateral play and displacement and aiding in maintaining the vertical plates 18 in parallelism with the slots, or channels, in which they move.

Projecting from the outer faces of the vertical plates 18 are brackets 21, upon which are journaled trolley-rolls 22, adapted to rest and travel upon conductors 23. These conductors are supported by insulating rails 24, which are slotted upon their bottom edges and seated upon ribs 25, which are formed, or mounted upon the foot-pieces 2, beneath the overhanging upper parts of the conduit-walls. In the upper edges of the rails 24 are formed channels 26, in which the conductors 23 are inserted, a suitable gum, or any resinous, or plastic material being used to secure the conductors in said channels. The insulating rails 24 may if thought necessary be secured upon the ribs 25 in any suitable manner.

The horizontal arms 17 lie very near the flat faces 4 of the conduit, and in order to enter the channels on opposite sides of the filling-blocks said arms must pass under the lateral edges of the sectional covering-plates. From the two vertical edges of each of the vertical plates 18 project lugs 27, of such width that their lower edges lie in the channels and below the top of the conduit. The upper edges of said lugs are curved from points in the same plane with the upper surfaces of the arms 17 down to the lower edges of said lugs, the points of said lugs lying at a little distance from the edges of the plates 18. These points will always lie within the channels traversed by said plates, part of the curved edge of each lug being below, and part above, the flat faces 4 of the conduit. In these lugs, and partly within the horizontal arms 17 and vertical plates 18, are formed chambers 28, within which are journaled rolls 29, the peripheries of the latter rising a little above the surfaces of the horizontal arms 18.

The trolley-frame is connected to a transverse bar 30, of the car-truck by sawing slots 31 into said bar to receive the vertical members of the trolley frame, the width of the slots being such as to permit the usual lateral play of the truck without wrenching, or straining the trolley-frame. When in place, the trolley frame is held by a hinged bar 32, thrown in front of it, the end of said bar having a tongue 33, which seats in a groove in the transverse bar 30 and is fastened in any suitable manner. The trolley-frame is prevented from falling too far by means of a bar 34, inserted in elongated openings 35, in the vertical members of the trolley frame, above the transverse bar 30.

The electric conductors may be laid after the conduit is put down and may be removed, or repaired, at any time by simply detaching one or more of the covering-plates, and removing as many of the filling-blocks as may be necessary. The covering-plates may be readily detached by lifting their webs out of the channels in the filling-blocks and above the slot far enough to permit the disengagement of the studs and elongated openings, and are easily and quickly connected again and restored to their place. As the plates extend beyond the edges of the slot no seat is needed for them to fit in and the danger of rubbish dropping into the conduit as the slot-cover is raised by the passage of the car is greatly diminished.

With a slot-cover of the construction described, there is no necessity of employing means for holding the same down in front and in rear of the trolley, as only one of the covering-plates will be raised bodily by the trolley, the two adjacent plates being merely raised at one end. The covering-plates are always retained in accurate relations to the slot by the channels in the filling-blocks.

Should any one or more of the covering-plates be removed for any purpose, the trolley will pass without difficulty, as its projecting lugs, which lie partly in and partly above, the slot, will always lift and pass under the end of the plate from which the removed member has been disconnected.

What I claim is—

1. In an electric-railway, a slot-cover composed of a series of plates of rigid material having central, depending webs which are pivotally linked together, substantially as described.

2. A slot-cover, composed of a series of rigid plates having central, depending webs which are pivotally linked together, and filling-blocks having channels in which said webs lie, substantially as described.

3. The combination with a conduit for electric wires, of a slot-cover composed of rigid plates having central depending webs, and sectional filling-blocks having channels in which said webs lie, the ends of the latter being lapped upon and pivotally linked to each other, substantially as described.

4. The combination with a conduit for electric conductors, of a series of channel-bars, a series of filling-blocks detachably seated in said channel-bars and having their upper edges lying in the slot, a series of rigid covering plates having central, depending webs lapped upon and linked pivotally to each other and lying in channels in the filling-blocks, and a trolley having horizontal arms passing under the edges of the covering-plates and vertical plates passing downward in channels between the filling-blocks and the sides of the slot, substantially as described.

5. The combination with a conduit for electric conductors, of a series of channel-bars, a series of filling-blocks detachably seated in said channel-bars and having their ends oppositely beveled and the upper and longer edges of said filling-blocks lying in the slot of the conduit, and a series of rigid covering-plates having central, depending webs lying in channels in the filling-blocks and linked pivotally to each other, substantially as described.

6. A slot-cover for electric conduits, consisting of a series of rigid covering-plates, adapted to overlie and extend beyond the edges of the slot and having central, depending webs projecting at one end beyond the ends of the covering-plates, and gained to overlap the gained ends of the adjacent webs to which they are connected by a stud on one engaging an elongated opening in the other, substantially as described.

7. The combination with an electric conduit, of a series of filling-blocks detachably seated in channel-bars and having their upper edges rising into the slot, a channel being provided on each side of the filling-blocks for the vertical plates of the trolley, substantially as described.

8. The combination with an electric conduit of a slot-cover consisting of a series of rigid covering-plates adapted to overlie and extend beyond the edges of the slot and provided with central, depending webs which extend beyond the plates at one end and are gained and lapped upon the gained ends of the adjacent webs, to which they are connected by a stud on one and an elongated opening in the other, and a series of filling-blocks removably arranged in the conduit and rising into the slot, their upper edges having channels to receive the connected webs, substantially as described.

9. The combination with an electric conduit of a slot-cover consisting of a series of rigid covering-plates overlying and projecting beyond the edges of the slot and provided with central, depending webs connected at their ends by studs and elongated openings, a series of removable filling-blocks having channels in which said webs lie, central channel-bars in which the edges of the filling-blocks are seated, and a trolley having arms passing under the edges of the covering-plates and provided with lugs lying partly in and partly above channels on opposite sides of the filling-blocks, substantially as described.

10. The combination with an electric conduit of a series of rigid covering-plates adapted to over-lie and project beyond the edges of the slot and provided with central webs pivotally linked together, a series of filling-blocks having channels in which said webs lie, a series of channel-bars in which the lower edges of the filling-blocks are detachably seated, a trolley having arms which project under the edges of the covering-plates and vertical plates lying in channels on opposite sides of the filling-blocks, said plates having their lower ends provided with friction-rolls adapted to bear upon opposite sides of the channel-bars and lugs lying partly in and partly above the slot and having rolls to support the covering-plates, substantially as described.

In testimony whereof I have hereunto set my hand and affixed my seal in presence of two subscribing witnesses.

CHARLES I. GREER. [L. S.]

Witnesses:
 JAMES L. NORRIS,
 NATHAN H. ROBBINS.